(12) United States Patent
Momono et al.

(10) Patent No.: US 9,636,856 B2
(45) Date of Patent: May 2, 2017

(54) MOLDING SYSTEM AND METHOD OF MANUFACTURING MOLDED ARTICLE

(71) Applicant: Toshiba Kikai Kabushiki Kaisha, Chiyoda-ku, Tokyo (JP)

(72) Inventors: Masamichi Momono, Numazu (JP); Nobuyuki Asanuma, Numazu (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 14/278,304

(22) Filed: May 15, 2014

(65) Prior Publication Data

US 2014/0339727 A1 Nov. 20, 2014

(30) Foreign Application Priority Data

May 15, 2013 (JP) .................................. 2013-103417
Apr. 11, 2014 (JP) .................................. 2014-082188

(51) Int. Cl.
*B29C 45/14* (2006.01)
*B29C 45/38* (2006.01)
(Continued)

(52) U.S. Cl.
CPC .... *B29C 45/1418* (2013.01); *B29C 45/14008* (2013.01); *B29C 45/42* (2013.01);
(Continued)

(58) Field of Classification Search
CPC .......... B29C 45/1418; B29C 45/14008; B29C 45/0084; B29C 45/382; B29C 2045/425; B29C 2045/14286
See application file for complete search history.

(56) References Cited

U.S. PATENT DOCUMENTS 3,861,955 A 1/1975 Lemelson
3,890,679 A 6/1975 Simon
(Continued)

FOREIGN PATENT DOCUMENTS

CA 2 130 925 6/2002
CN 1183072 5/1998
(Continued)

OTHER PUBLICATIONS

English Language Abstract and Translation of JP 2008-126526 published Jun. 5, 2008.
(Continued)

*Primary Examiner* — Robert B Davis
(74) *Attorney, Agent, or Firm* — DLA Piper LLP US

(57) ABSTRACT

A molding system 10 for manufacturing a molded article Q by integrally molding a sheet-shaped insert member S and a molding material R, the molding system comprising: a sheet supply part 20 configured to supply the insert member S; a sheet heating part 30 configured to heat the insert member S; a molding apparatus 100 configured to form the molded article Q by integrally molding the insert member S and the molding material R; an ejector 200 including a delivery position 222 and configured to transfer the insert member S between the sheet heating part 30 and the molding apparatus 100 and to eject and transfer the molded article Q from the molding apparatus; and a transfer robot configured to transfer the insert member S or the molded article Q between the sheet supply part 20 and the ejector.

4 Claims, 9 Drawing Sheets

(51) Int. Cl.
    *B29C 45/42* (2006.01)
    *B29C 45/00* (2006.01)
(52) U.S. Cl.
    CPC .......... *B29C 45/0084* (2013.01); *B29C 45/38* (2013.01); *B29C 45/382* (2013.01); *B29C 2045/14286* (2013.01); *B29C 2045/425* (2013.01)

(56) References Cited

U.S. PATENT DOCUMENTS

| | | | |
|---|---|---|---|
| 4,956,139 | A | 9/1990 | Koizumi et al. |
| 5,061,169 | A * | 10/1991 | Yamashiro .......... B29C 45/0084 264/297.2 |
| 5,486,329 | A | 1/1996 | Ueki et al. |
| 5,518,716 | A | 5/1996 | Riccio et al. |
| 5,800,759 | A | 9/1998 | Yamazaki et al. |
| 5,989,480 | A | 11/1999 | Yamazaki |
| 6,004,497 | A * | 12/1999 | Bisognin .............. B29C 43/184 264/153 |
| 6,251,333 | B1 | 6/2001 | Zheng et al. |
| 6,660,200 | B2 | 12/2003 | Nakajo |
| 6,673,296 | B2 | 1/2004 | Hiraiwa et al. |
| 2002/0017732 | A1 | 2/2002 | Koyama et al. |
| 2002/0020933 | A1 | 2/2002 | Sekiguchi et al. |
| 2007/0184273 | A1 | 8/2007 | MacDonald et al. |

FOREIGN PATENT DOCUMENTS

| | | |
|---|---|---|
| CN | 1611339 | 5/2005 |
| DE | 19620002 | 11/1996 |
| DE | 10 2007 036 660 | 2/2009 |
| DE | 10 2011 103824 | 12/2012 |
| EP | 0 642 910 | 3/1995 |
| JP | H04-101833 | 4/1992 |
| JP | H06-238710 | 8/1994 |
| JP | H06-270199 | 9/1994 |
| JP | H08-047632 | 2/1996 |
| JP | H08-336833 | 12/1996 |
| JP | H09-055142 | 2/1997 |
| JP | 2967927 | 8/1999 |
| JP | 2000-102947 | 4/2000 |
| JP | 2000-263583 | 9/2000 |
| JP | 3104138 B2 * | 10/2000 .......... B29C 45/382 |
| JP | 2001-308121 | 11/2001 |
| JP | 2002-046154 | 2/2002 |
| JP | 2002-096349 | 4/2002 |
| JP | 2003-170469 | 6/2003 |
| JP | 2003-236876 | 8/2003 |
| JP | 2005-136193 | 5/2005 |
| JP | 2007-160736 | 6/2007 |
| JP | 2008-126526 | 6/2008 |
| JP | 2008-302610 | 12/2008 |
| JP | 2009-269189 | 11/2009 |
| JP | 2010-027890 | 2/2010 |
| JP | 2012-045734 | 3/2012 |
| JP | 2012-161922 | 8/2012 |
| JP | 2012-179773 | 9/2012 |
| JP | 2014-200993 | 10/2014 |
| JP | 2014-201050 | 10/2014 |
| WO | WO 94/14590 | 7/1994 |
| WO | WO 97/27987 | 8/1997 |
| WO | WO 2012/163677 | 12/2012 |
| WO | WO 2015/049339 | 4/2015 |

OTHER PUBLICATIONS

English Language Abstract and Translation of JP H06-270199 published Sep. 27, 1994.
English Language Abstract and Translation of JP H06-238710 published Aug. 30, 1994.
English Language Abstract and Translation of JP 2003-236876 published Aug. 26, 2003.
English Language Abstract and Translation of JP 2012-179773 published Sep. 20, 2012.
English Language Abstract and Translation of JP H08-336833 published Dec. 24, 1994.
German Office Action issued in DE 10 2014 209 100.4 dated Dec. 10, 2014.
English Language Translation for German Office Action issued in DE 10 2014 209 100.4 dated Dec. 10, 2014.
English Language Abstract for DE 10 2007 036 660 published Feb. 5, 2009.
Japanese Office Action issued in JP 2014-055447 mailed Feb. 24, 2015 with English Language Translation.
English Language Abstract and Translation for JP 2002-096349 published Apr. 2, 2002.
English Language Abstract and Translation for JP H09-055142 published Feb. 25, 1997.
English Language Abstract and Translation for JP 2012-161922 published Aug. 30, 2012.
English Language Abstract and Translation for JP 2001-308121 published Nov. 2, 2001.
English Language Abstract and Translation for JP 2014-201050 published Oct. 27, 2014.
English Language Abstract and Translation for JP 2014-200993 published Oct. 27, 2013.
German Office Action issued in GB 10 2014 209 093.8 dated May 26, 2015 with English Language Translation.
German Office Action issued in DE 10 2014 209 099.7 dated May 19, 2015 with Translation.
English Language Abstract for DE 19620002 published Nov. 21, 1996.
English Language Abstract for DE 10 2011 103824 published Dec. 6, 2012.
Chinese Office Action issued in CN 201410203190.7 issued Jan. 18, 2016 with English Language Translation.
English Language Translation for JP 2967927 published Aug. 20, 1999.
English Language Abstract for CN 1611339 published May 4, 2005.
Chinese Office Action issued in CN 201410203243.5 on Feb. 24, 2016 with English Language Translation.
Chinese Office Action issued in CN 201410202945.1 on Feb. 3, 2016 with English Language Translation.
English Language Abstract and Translation of CN 1183072 published on May 27, 1998.
Japanese Office Action issued in JP 2014-078132 mailed Aug. 18, 2015.
English Language Translation for Japanese Office Action issued in JP 2014-078132 mailed Aug. 18, 2015.
English Language Abstract for JP 2000-263583 published Sep. 25, 2000.
English Language Abstract for JP 2003-170469 published Jun. 17, 2003.
English Language Abstract for JP H04-101833 published Apr. 3, 1992.
English Language Abstract for JP H08-047632 published Feb. 20, 1996.
English Language Translation for JP H08-047632 published Feb. 20, 1996.
English Language Abstract and Translation for JP 2010-027890 published Feb. 4, 2010.
English Language Abstract and Translation for JP 2007-160736 published Jun. 28, 2007.
English Language Abstract and Translation for JP 2009-269189 published Nov. 19, 2009.
Japanese Office Action issued in JP 2014-082188 mailed Sep. 29, 2015.
English Language Translation for Japanese Office Action issued in JP 2014-082188 mailed Sep. 29, 2015.
English Language Abstract and Translation for JP 2000-102947 published Apr. 11, 2000.
English Language Abstract and Translation for JP 2012-045734 published Mar. 8, 2012.
English Language Abstract and Translation for JP 2008-302610 published Dec. 18, 2008.

(56) References Cited

OTHER PUBLICATIONS

English Language Abstract and Translation for JP 2005-136193 published May 26, 2005.
Chinese Office Action (with English Translation) issued in CN 201410203243.5 dated Nov. 7, 2016.
U.S. Appl. No. 14/277,533.
U.S. Appl. No. 14/278,286.

* cited by examiner

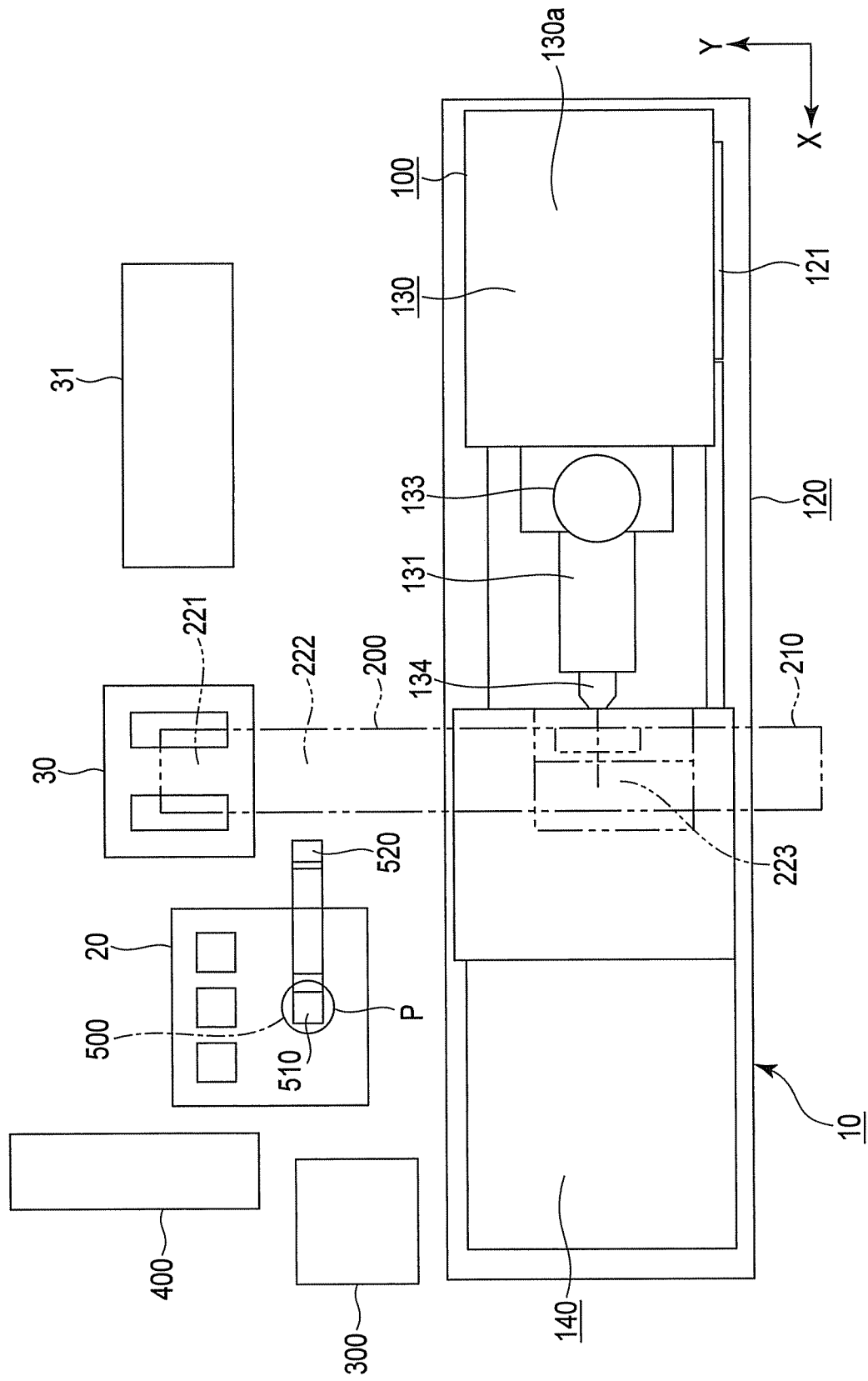
F I G. 2

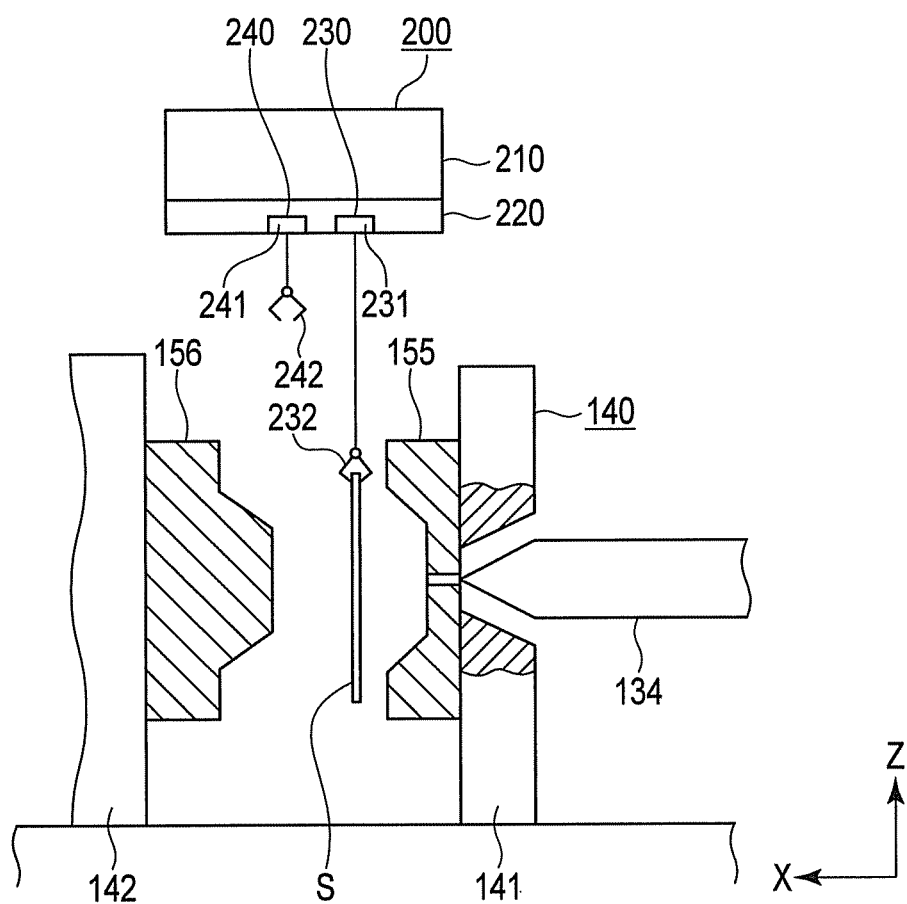
F I G. 3

| Transfer robot | Extraction machine | | Sheet heating part (Heating position) | Injection molding machine | | Gate cutting apparatus |
| --- | --- | --- | --- | --- | --- | --- |
| | Sheet side | Molded product side | | Mold clamping | Injection | |
| S1:Move to sheet supply position | S1:Wait above sheet delivery position | S0:Wait at molded product delivery position | | | S1:Measure | |
| S1:Turn on sheet suction | | | | | | |
| S1:Move to sheet delivery position | | | | | | |
| | S1:Move down to sheet delivery position | | | | | |
| | S1: Grip sheet | | | | | |
| | | | | | | |
| S1:Turn off sheet suction | | | | | | |
| | S1:Move to heating position | S0:Move to heating retreat position | | | | |
| | | | S1:Start heating | | | |
| | | | S1:End heating | | | |
| | S1:Move to insert position | S0:Move to insert retreat position | | | | |
| | | | | S1:Close mold | | |
| S2:Move to sheet supply position | | | | | | |

FIG. 6A

| Transfer robot | Extraction machine | | Sheet heating part (Heating position) | Injection molding machine | | Gate cutting apparatus |
|---|---|---|---|---|---|---|
| | Sheet side | Molded product side | | Mold clamping | Injection | |
| S2:Turn on sheet suction | | | | S1:Temporary stoppage | | |
| S2:Move to sheet delivery position | S1:Move up | | | | | |
| | S2:Move to position above sheet delivery position | S0:Move to position above molded product delivery position | | | | |
| | S2:Move down to sheet delivery position | | | S1:Close mold | | |
| | S2:Grip sheet | | | | | |
| | | | | | S1:Inject | |
| | S2:Move to heating position | S1:Move to heating retreat position | | | → | |
| S2:Turn off sheet suction | | | | | → | |
| | | | S2:Start heating | | S1:Cool S2:Measure | |
| | | | S2:End heating | S1:Open mold | | |
| | | S1:Move to molded product extraction position | | | | |
| | | | | S1:Push out | | |
| | | S1:Grip molded product | | | | |

FIG. 6B

| Transfer robot | Extraction machine | | Sheet heating part (Heating position) | Injection molding machine | | Gate cutting apparatus |
| --- | --- | --- | --- | --- | --- | --- |
| | Sheet side | Molded product side | | Mold clamping | Injection | |
| | S2:Move to insert position | S1:Move to insert retreat position | | | | |
| S3:Move to sheet supply position | | | | S2:Close mold | | |
| S3:Turn on sheet suction | S2:Move up | | | S2:Temporary stoppage | | |
| S3:Move to sheet delivery position | | | | S2:Close mold | | |
| | S3:Move to position above sheet delivery position | S1:Move to position above molded product delivery position | | | | |
| | S3:Move down to sheet delivery position | | | | S2:Inject | |
| | S3:Grip sheet | | | | → | |
| S3:Turn off sheet suction | S3:Move to molded product delivery retreat position | S1:Move to molded product delivery position | | | → | |
| | | | | | → | |
| S1:Move to molded product delivery position | | | | | → | |
| S1:Turn on molded product suction | | | | | → | |

FIG. 6C

| Transfer robot | Extraction machine | | Sheet heating part (Heating position) | Injection molding machine | | Gate cutting apparatus |
|---|---|---|---|---|---|---|
| | Sheet side | Molded product side | | Mold clamping | Injection | |
| S1:Move to gate cutting position | | S1:Turn off molded product suction | | | → | |
| | S3:Move to heating position | S2:Move to heating retreat position | | | → | |
| | | | S3:Start heating | | S2:Cool S3:Measure | S1:Cut off gate |
| S1:Move to conveyor apparatus | | | S3:End heating | S2:Open mold | | |
| S1:Turn off molded product suction | S3:Move to molded product extraction retreat position | S2:Move to molded product extraction position | | | | |
| | | S2:Grip molded product | | S2:Push out | | |
| S4:Move to sheet supply position | S3:Move to insert position | S2:Move to insert retreat position | | | | |
| S4:Turn on sheet suction | | | | S3:Close mold | | |
| S4:Move to sheet delivery position | | | | S3:Temporary stoppage | | |
| | S3:Move up | | | | | |
| | | | | S3:Close mold | | |

F I G. 6D

MOLDING SYSTEM AND METHOD OF MANUFACTURING MOLDED ARTICLE

CROSS-REFERENCE TO RELATED APPLICATIONS

This application is based upon and claims the benefit of priority from prior Japanese Patent Applications No. 2013-103417, filed May 15, 2013; and No. 2014-082188, filed Apr. 11, 2014, the entire contents of all of which are incorporated herein by reference.

BACKGROUND OF THE INVENTION

1. Field of the Invention

The present invention relates to a molding system and a method of manufacturing a molded article for manufacturing the molded article by combining a sheet-shaped insert member and a molding material.

2. Description of the Related Art

Press molding is known as a method for molding a sheet-shaped prepreg.

There are various known types of techniques regarding heating and insert molding of a prepreg sheet (for example, see Jpn. Pat. Appln. KOKAI Publication No. H6-270199 and Jpn. Pat. Appln. KOKAI Publication No. 2012-179773). Furthermore, there are also various types of known techniques regarding a post process after injection molding (for example, see Jpn. Pat. Appln. KOKAI Publication No. H8-336833).

However, conventional prepreg uses a material based on a thermosetting resin, so it takes a long time for molding and thereby lowers productivity. Consequently, conventional prepreg increases the unit price of molded articles produced from it, so it is difficult to be used for mass produced products such as compact cars, and is currently applied only to low-production-volume products such as airplanes and high-class cars.

BRIEF SUMMARY OF THE INVENTION

An object of the present invention is to provide a molding system and a method of manufacturing a molded article, which can realize high productivity by using a direct-injection molding method, when combining a sheet-shaped insert member and a molding material. To solve the above problem and achieve the object, the molding system and the method of manufacturing the molded article to the present invention have the following structure.

A molding system for manufacturing a molded article by integrally molding a sheet-shaped insert member and a molding material, the molding system comprising: a sheet supply part arranged around a predetermined reference position and configured to supply the insert member; a sheet heating part configured to heat the insert member; a molding apparatus configured to form the molded article by integrally molding the insert member and the molding material; an ejector including a delivery position arranged around the reference position and configured to transfer the insert member between the sheet heating part and the molding apparatus and to eject and transfer the molded article from the molding apparatus; and a transfer robot arranged at the reference position and configured to transfer the insert member or the molded article between the sheet supply part and the ejector.

A method of manufacturing a molded article for manufacturing the molded article by integrally molding a sheet-shaped insert member and a molding material, the method of manufacturing the molded article comprising: supplying the insert member from a sheet supply part arranged around a predetermined reference position; heating the insert member by a sheet heating part; forming the molded article by integrally molding the insert member and the molding material by a molding apparatus; transferring at least one of the insert member and the molded article by an ejector including a delivery position arranged around the reference position; and transferring at least one of the insert member and the molded article between the sheet supply part and the ejector by a transfer robot arranged at the reference position.

According to the present invention, it is possible to realize high productivity by using a direct-injection molding method, when combining a sheet-shaped insert member and a molding material.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a plan view schematically showing the hybrid molding system;

FIG. 3 is a side view schematically showing an insert operation performed in the hybrid molding system;

FIG. 6A is an explanatory chart showing the flow of operations performed in the hybrid molding system;

FIG. 6B is an explanatory chart showing the flow of operations performed in the hybrid molding system;

FIG. 6C is an explanatory chart showing the flow of operations performed in the hybrid molding system; and FIG. 6D is an explanatory chart showing the flow of operations performed in the hybrid molding system.

DETAILED DESCRIPTION OF THE INVENTION

Figure 1:
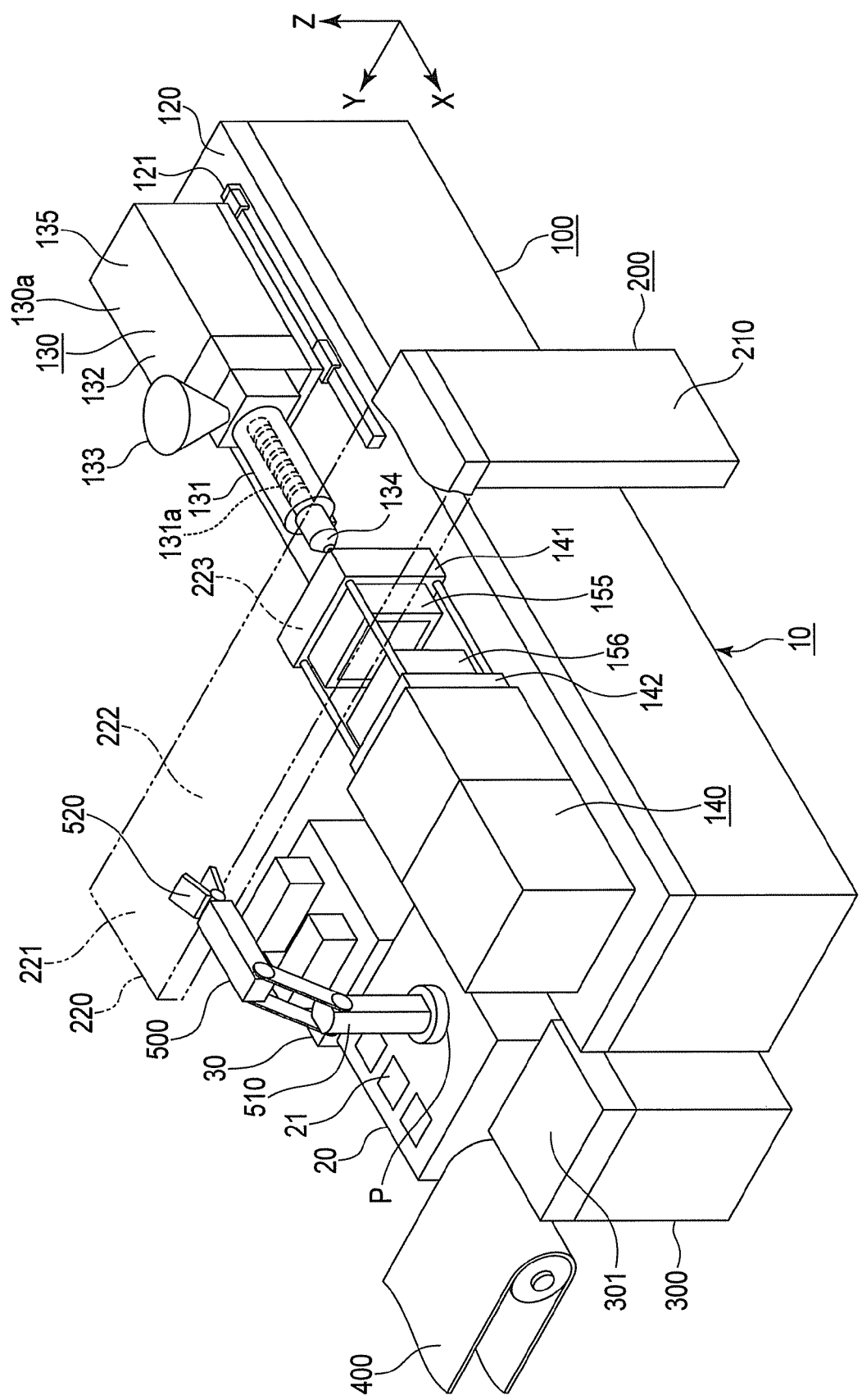
FIG. 1 is a perspective view schematically showing a hybrid molding system according to an embodiment of the present invention.
Figure 4:
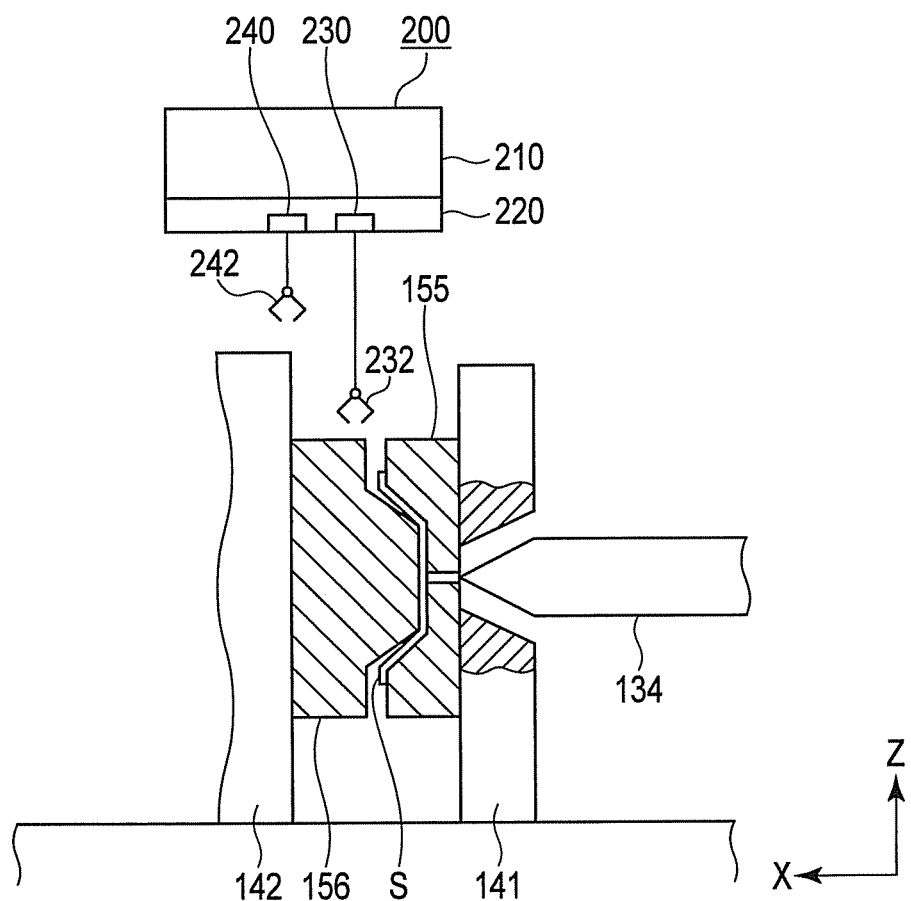
FIG. 4 is a side view schematically showing the insert operation performed in the hybrid molding system.
Figure 5:
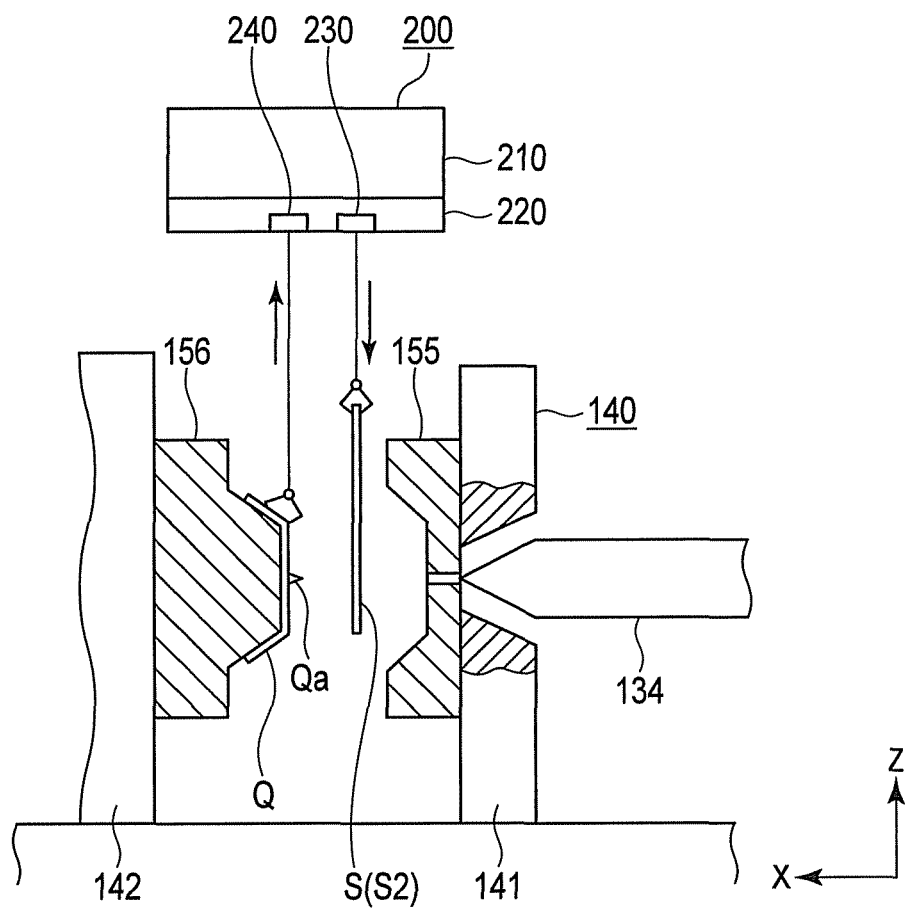
FIG. 5 is a side view schematically showing the insert operation performed in the hybrid molding system.

FIG. 1 is a perspective view showing a hybrid molding system 10 according to an embodiment of the present invention, which is configured to manufacture a molded article Q by integrally molding a sheet (sheet-shaped insert member) S and a resin material (molding material) R. FIG. 2 is a plan view schematically showing the hybrid molding system. FIG. 3 is a side view schematically showing an operation performed by a mold part built in the hybrid molding system. FIG. 4 is a side view schematically showing the operation performed by the mold part built in the hybrid molding system. FIG. 5 is a side view schematically showing the operation performed by the mold part built in the hybrid molding system. FIG. 6A to FIG. 6D (FIG. 6A, FIG. 6B, FIG. 6C, and FIG. 6D) is an explanatory chart showing the flow of operations performed in the hybrid molding system.

In these drawings, arrows X, Y, and Z respectively denote three directions orthogonal to each other, wherein the arrows X and Y denote the horizontal directions and the arrow Z denotes the vertical direction.

The hybrid molding system (molding system) 10 includes a sheet supply part 20 arranged around a reference position P and configured to supply each sheet S; a sheet heating part 30 configured to heat the sheet S; an injection molding machine (molding machine or molding apparatus) 100 configured to form a molded article Q by integrally molding the sheet S and the resin material (molding material) R; an ejector 200 including a delivery position arranged around the reference position P and configured to transfer the sheet S and the molded article Q between the sheet heating part 30 and the injection molding machine 100; a gate cutting apparatus 300 arranged around the reference position P and configured to cut off gates attached to the molded article Q; a conveyor apparatus 400 arranged around the reference position P and configured to convey the molded article Q; and a transfer robot 500 arranged at the reference position P and configured to hold and transfer the sheet S or the molded article Q between the sheet supply part 20, the ejector 200, the gate cutting apparatus 300, and the conveyor apparatus 400. For example, the sheet (sheet-shaped insert member) S is a sheet-shaped thermoplastic prepreg.

The sheet supply part 20 includes the function of delivering the sheet S to the transfer robot 500 at a sheet supply position 21.

The sheet heating part 30 includes the function of heating the sheet S, which is held by the ejector 200, by use of an electric heater. In FIG. 2, the reference symbol 31 denotes a power supply portion for supplying power to the sheet heating part 30.

The injection molding machine 100 includes a base 120, an injection device 130, and a mold clamping device 140. The base 120 is equipped with rails 121 thereon. The rails 121 extend in the longitudinal direction of the base 120. The injection device 130 is placed on the rails 121 and is movable along the rails 121.

For example, the injection device 130 includes a housing 130a, a cylinder 131 containing a screw 131a inside, a drive unit 132 configured to rotate the screw 131a in the cylinder 131 contained in the housing 130a, a hopper 133, and a drive unit 135 configured to move the screw 131a contained in the housing 130a back and forth.

The cylinder 131 includes an injection nozzle 134 provided at the distal end. The hopper 133 contains a resin, which is an example of the material to be melted. The resin serving as the material is supplied from inside the hopper 133 into the cylinder 131. The injection device 130 is moved by driving a drive unit 136 (not shown), so that the injection nozzle 134 is communicated with a cavity formed inside a fixed mold 155 and a movable mold 156 described later.

The cylinder 131 is equipped with a heating device. The heating device (not shown) is configured to keep heating the cylinder 131. The resin serving as the material (molding material) is supplied from the hopper 133 and is moved through the inside of the cylinder 131 toward the injection nozzle 134 by the screw 131a being rotated by the drive unit 132. During this movement, heat is transferred from the cylinder 131 to the resin, and the resin is thereby melted. The resin thus melted is stored near the injection nozzle 134. As the stored resin increases, the screw 131a is pushed back toward the hopper 133 due to the pressure of the stored resin. When the melted resin reaches a predetermined storage amount, the screw 131a is pushed toward the injection nozzle 134 by the drive unit 135, so that the resin is injected into the cavity formed between the fixed mold 155 and the movable mold 156, which are attached to the mold clamping device 140.

For example, the mold clamping device 140 includes a fixed platen 141 and a movable platen 142 configured to be moved back and forth relative to the fixed platen 141. The fixed mold 155 is attached to the fixed platen 141. The movable mold 156 is attached to the movable platen 142. For example, the movable platen 142 is moved back and forth relative to the fixed platen 141 by a toggle mechanism and a drive unit for expanding and contracting this toggle mechanism. The toggle mechanism is connected to the movable platen 142.

The fixed mold 155 and the movable mold 156 respectively include cavities inside, which correspond to a product to be molded. When the movable platen 142 is moved toward the fixed platen 141, and the movable mold 156 is thereby brought into contact with the fixed mold 155, a cavity corresponding to the molded article Q is formed by the fixed mold 155 and the movable mold 156.

For example, the ejector 200 includes a trestle 210 arranged along the direction indicated by the arrow Y, a guide 220 provided on this trestle 210, and a pair of holding mechanisms 230 and 240 disposed adjacent to each other in the direction indicated by the arrow X and configured to be guided by the guide 220 in the direction indicated by the arrow Y.

The guide 220 includes a delivery position (sheet delivery position, molded article delivery position) 222 where the sheet S or the molded article Q is delivered between the heating position 221 and the transfer robot 500, and an insert position 223 other than the delivery position.

For example, the holding mechanism 230 includes a height position adjusting mechanism 231 and a holding hand 232 provided at the lower end of this height position adjusting mechanism 231. The holding mechanism 240 includes a height position adjusting mechanism 241 and a holding hand 242 provided at the lower end of this height position adjusting mechanism 241. The holding mechanism 230 and the holding mechanism 240 can be respectively operated independently of each other, and the positions of the holding mechanism 230 and the holding mechanism 240 relative to the guide 220 may be set to always be in the same position, or it may also not be set to always be in the position.

The gate cutting apparatus 300 includes the function of cutting off a gate Qa from the molded article Q held by the transfer robot 500, at a gate cutting position 301. The conveyor apparatus 400 includes the function of conveying the molded article Q to the outside of the system by use of a belt conveyor, or the like, for example.

The transfer robot 500 is an articulated robot, such as a six axis robot, and includes a robot main body 510, whose rotational shaft in the direction indicated by the arrow Z is extended through the reference position P and is fixed to the floor surface, and a chuck 520 provided at the distal end of this robot main body 510. The chuck 520 may be either of a pinching chuck and/or a vacuum chuck, as long as it can hold the sheet S and/or the molded article Q.

The transfer robot 500 can position its chuck 520 at the sheet supply position 21 of the sheet supply part 20, the delivery position 222 of the ejector 200, the gate cutting position 301 of the gate cutting apparatus 300, and the position of the conveyor apparatus 400.

In the hybrid molding system 10 designed as described above, the molded article Q is produced, as follows. In this respect, the chart shown in FIG. 6A to FIG. 6D explains the operation of the respective system parts. In FIG. 6A to FIG. 6D, S1 represents an arbitrary sheet of sheets S, and S2 represents a sheet to be processed subsequently to S1.

The transfer robot 500 receives the sheet S (S1) at the sheet supply position 21 of the sheet supply part 20. Then, it moves to the delivery position 222 of the ejector 200 and delivers the sheet S to the holding hand 232 of the holding mechanism 230 of the ejector 200. Then, the holding mechanism 230 is moved along the guide 220 and is stopped at a position above the heating position 221. Then, the sheet S is moved down by the height position adjusting mechanism 231 into the sheet heating part 30 and is heated to a suitable temperature. In a case where the height of the sheet at the sheet delivery position is the same as a height that allows heating of the sheet by the sheet heating part 30, the height adjusting operation by the height position adjusting mechanism 231 may be omitted.

Then, the sheet S is moved up, and then the holding mechanism 230 is moved to the insert position 223.

Next, the sheet S is moved down by the height position adjusting mechanism 231 and is positioned between the fixed mold 155 and the movable mold 156, as shown in FIG. 3. Then, the fixed mold 155 and the movable mold 156 are clamped by operating the mold clamping device 140, so that a mold for shaping the sheet S is formed, as shown in FIG. 4. Then, the melted resin material is injected, so that the sheet S and the resin material are integrated to mold the molded article Q.

Next, as shown in FIG. 5, the fixed mold 155 and the movable mold 156 are set to open the mold, and the molded article Q is taken out by the holding mechanism 240. At this time, the next sheet S (S2) is positioned between the fixed mold 155 and the movable mold 156.

Then, the holding mechanism 240 is moved to the delivery position 222, and the transfer robot 500 operates to hold the molded article Q. Next, the transfer robot 500 transfers the molded article Q to the gate cutting position 301 of the gate cutting apparatus 300, and the gate cutting apparatus 300 operates to cut off the gate Qa of the molded article Q. Thereafter, the transfer robot 500 places the molded article Q onto the conveyor apparatus 400. Consequently, the process of manufacturing one molded article Q by hybrid molding is completed.

As shown in FIG. 6A to FIG. 6D, the manufacturing process can be performed so that the operations for the arbitrary sheet S1 and the operations for the next sheet S2 partly overlap with each other. For example, while the injection molding machine 100 performs mold closing, injection, cooling, mold opening, and ejecting, the transfer robot 500 receives the next sheet S (S2) from the sheet supply part 20 and delivers the sheet S to the ejector 200, and further the transfer robot 500 receives the molded article Q from the ejector 200 and delivers the molded article Q to the gate cutting apparatus 300, and then the transfer robot 500 receives the molded article Q from the gate cutting apparatus 300 and delivers the molded article Q to the conveyor apparatus 400. The ejector 200 receives the next sheet S (S2) from the transfer robot 500, and heats the next sheet S (S2) by the sheet heating part 30. After the next sheet S (S2) is heated by the sheet heating part 30, the ejector 200 inserts the next sheet S (S2) into the injection molding machine 100 (more specifically, into the mold attached to the injection molding machine 100). Furthermore, after the molded article Q is molded by the injection molding machine 100, the ejector 200 ejects (receives) the molded article Q from the injection molding machine 100 and delivers the molded article Q to the transfer robot 500. The sheet heating part 30 heats the next sheet S (S2) transferred by the ejector 200 when it receives this next sheet S (S2). The sheet supply part 20, prepares (places) a further next sheet S at the predetermined deliver position to the transfer robot 500 after it delivers the next sheet S (S2) to the transfer robot 500. The gate cutting apparatus 300, after it receives the molded article Q from the transfer robot 500 and cuts off gates attached to the molded article Q, delivers the molded article Q back to the transfer robot 500. The conveyor apparatus 400 receives the molded article Q from the transfer robot 500 and transfers the molded article Q.

As described above, the hybrid molding system 10 according to this embodiment is configured to heat a sheet-shaped thermoplastic prepreg, to then insert it into the mold of the injection molding machine as it is, then to shape the thermoplastic prepreg by clamping the mold, and then to combine it with a resin material by injection. Accordingly, unlike a case where a thermosetting prepreg sheet is used, it does not require a press machine, and it can shorten the curing time. Thus, it is possible to realize high productivity when combining the sheet-shaped thermoplastic prepreg and the resin material. In addition, it is possible to mold a molded article having excellent mechanical properties by use of a direct-injection molding method.

The transfer robot 500 is arranged at the center, and the sheet supply part 20, the sheet heating part 30, the injection molding machine 100, the ejector 200, the gate cutting apparatus 300, and the conveyor apparatus 400 are arranged within a range where the transfer robot 500 can perform transfer, so it is possible to economize the space necessary for installing the entire system. Also, when the installation space of the entire molding system including the peripheral facilities is economized, the distances between the system parts become smaller, so it is possible to perform efficient production and to thereby shorten the manufacturing time per piece of molded articles.

In a case where molded articles which have no gate to cut off are molded, the gate cutting apparatus may be omitted. In this case, the installation space of the entire system is further economized.

Furthermore, in a case where there is no need to convey molded articles outside of the hybrid molding system, the conveyor apparatus may be omitted. In this case, the installation space of the entire system is further economized.

The present invention is not limited as-is to the embodiment described above, but may also be embodied along with some changes made in the structural elements in an implementation phase without departing from the gist of the embodiment. In addition, various inventions may be made by suitably combining a plurality of structure elements disclosed in the embodiment described above. For example, several structural elements may be omitted from the overall structure elements disclosed in the embodiment described above. In addition, structures according to different embodiments may be combined.

What is claimed is:

1. A molding system for manufacturing a molded article by integrally molding a sheet-shaped insert member and a molding material, the molding system comprising:

a sheet supply part arranged around a predetermined reference position and configured to supply the insert member;

a sheet heating part configured to heat the insert member;

a molding apparatus configured to form the molded article by integrally molding the insert member and the molding material;

an ejector including a delivery position arranged around the reference position and configured to transfer the insert member between the sheet heating part and the molding apparatus and to eject and transfer the molded article from the molding apparatus; and a transfer robot arranged at the reference position and configured to transfer the insert member or the molded article between the sheet supply part and the ejector.

2. The molding system according to claim 1, further comprising a conveyor apparatus arranged around the reference position and configured to convey the molded article;

wherein the transfer robot is arranged at the reference position and configured to transfer the insert member or the molded article between the sheet supply part, the ejector, and the conveyor apparatus.

3. The molding system according to claim 1, further comprising a gate cutting apparatus arranged around the reference position and configured to cut off a gate attached to the molded article;

wherein the transfer robot is arranged at the reference position and configured to transfer the insert member or the molded article between the sheet supply part, the ejector, and the gate cutting apparatus.

4. The molding system according to claim 2, further comprising a gate cutting apparatus arranged around the reference position and configured to cut off a gate attached to the molded article;

wherein the transfer robot is arranged at the reference position and configured to transfer the insert member or the molded article between the sheet supply part, the ejector, the gate cutting apparatus, and the conveyor apparatus.

* * * * *